INVENTORS
Joseph G. Maceyka
Roger J. O'Kane, Jr.
Hans Kothe
BY
ATTORNEYS

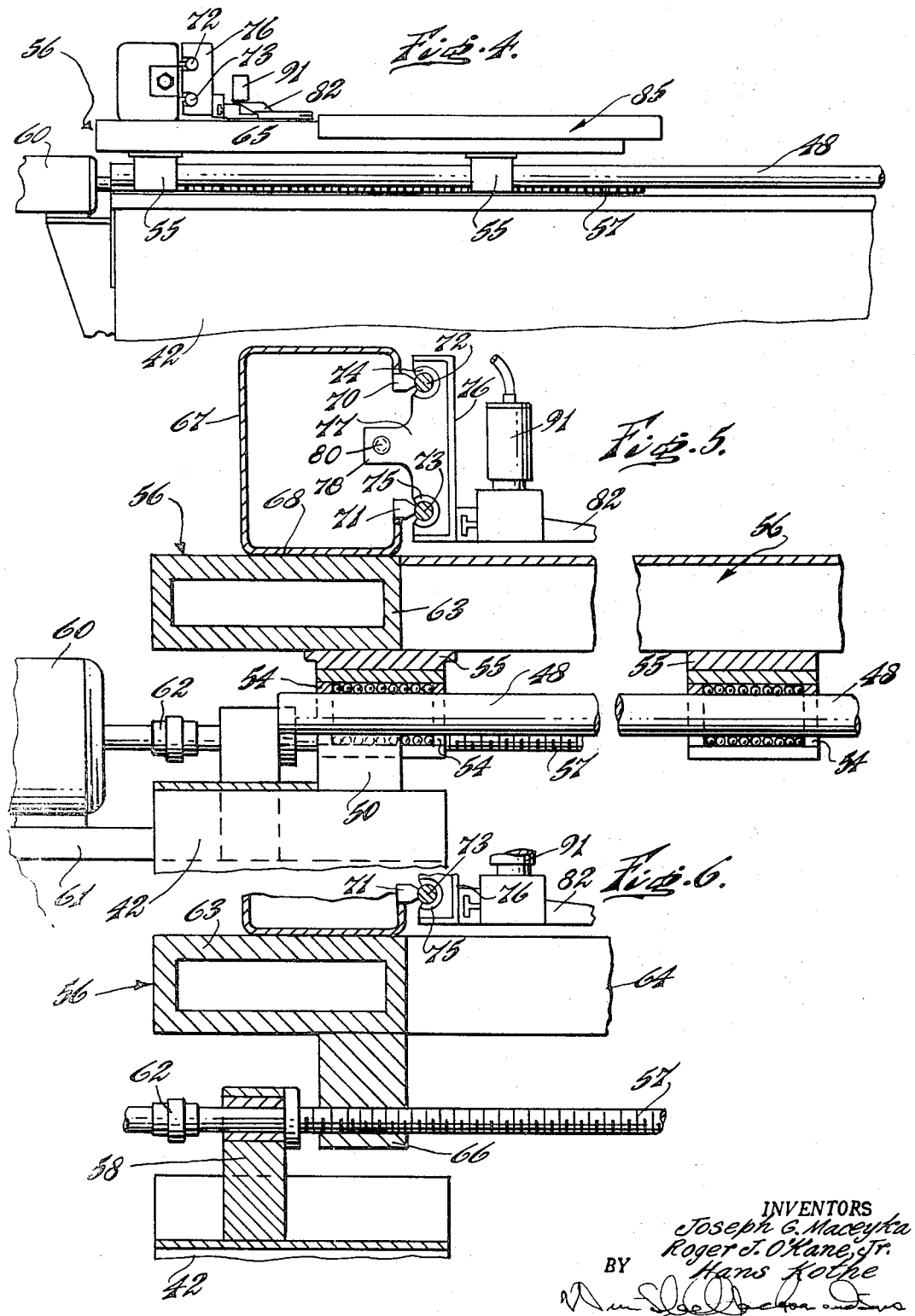

United States Patent Office 3,436,998
Patented Apr. 8, 1969

3,436,998
TABLE ASSEMBLY
Joseph G. Maceyka, West Chester, Roger J. O'Kane, Jr., Berwyn, and Hans Kothe, Philadelphia, Pa., assignors to The Warner & Swasey Company, Cleveland, Ohio, a corporation of Ohio
Filed Oct. 21, 1966, Ser. No. 588,469
Int. Cl. B26d 7/06
U.S. Cl. 83—412
2 Claims

ABSTRACT OF THE DISCLOSURE

Table assemblies are used for positioning and holding flat work sheets within a machine tool for punching and the like. In one prior art type of table assembly, a carriage moves on a table assembly base toward and away from the machine tool in a direction designated a Y direction, and a cross-slide moves laterally on the carriage in a direction designated an X direction. The cross-slide holds the workpiece in the machine tool. The present invention is concerned with an improved table assembly of this type. A U-shaped carriage is disposed horizontally with the open portion of the U directed toward the machine tool, and a cross-slide is positioned on the base of the U-shaped carriage. Parallel shafts are disposed respectively under the arms of the U to slidably support the carriage by means of linear bushings, and similar parallel shafts and linear bushings on the carriage support the cross-slide. Respective drive screws drive the carriage and cross-slide.

---

This invention pertains generally to a table assembly for positioning and supporting a workpiece in a machine tool, and more particularly to means for positioning a flat metal sheet with respect to coordinate X and Y axes in a machine tool and then supporting the sheet at the selected position during the machining operation.

The purpose of this invention is to rapidly, accurately, conveniently and repeatedly position a workpiece in a machine tool for a machine operation.

A further purpose is to position the table at relatively high speeds of up to, for instance, 280 inches per minute.

A further purpose is to achieve high positioning accuracy to, for instance, within ±.005 inch, as well as high repeatable accuracy.

A further purpose is to provide an extra-rigid table having substantially zero play and lasting precision alignment.

A further purpose is to achieve relatively trouble-free operation of a table assembly.

A further purpose is to provide a table assembly wherein it is easier to achieve and maintain squareness.

A further purpose is to more completely control within the table assembly external loads imparted to the table, including the load of the machine tool operation on the supported workpiece.

A further purpose is to eliminate prior art tracks having T cross-sections combined with a complicated system of rollers to engage the tracks.

A further purpose is to eliminate the necessity for the use of rollers in the various directions of load concerns.

A further purpose is to eliminate any thrust imparted to a screw-thread drive of the table assembly, other than from forces longitudinally of the screw-thread drive.

A further purpose is to provide in a table assembly a clear and unobstructed area between the parallel shafts of the assembly so that there is no interference to the work being done on the workpiece.

Further purposes appear in the specification and in the claims.

In the drawings, I have chosen to illustrate one only of the numerous embodiments in which our invention may appear, selecting the forms shown from the standpoints of convenience in illustration, satisfactory operation and clear demonstration of the principles involved.

FIGURE 4 is a side elevation of the table assembly of FIGURES 1 to 3.

FIGURE 5 is a fragmentary vertical section taken on the line 5—5 in FIGURE 2.

FIGURE 6 is a fragmentary vertical section taken on the line 6—6 in FIGURE 2.

FIGURE 7 is a schematic diagram of a positioning program control means.

Figure 1:
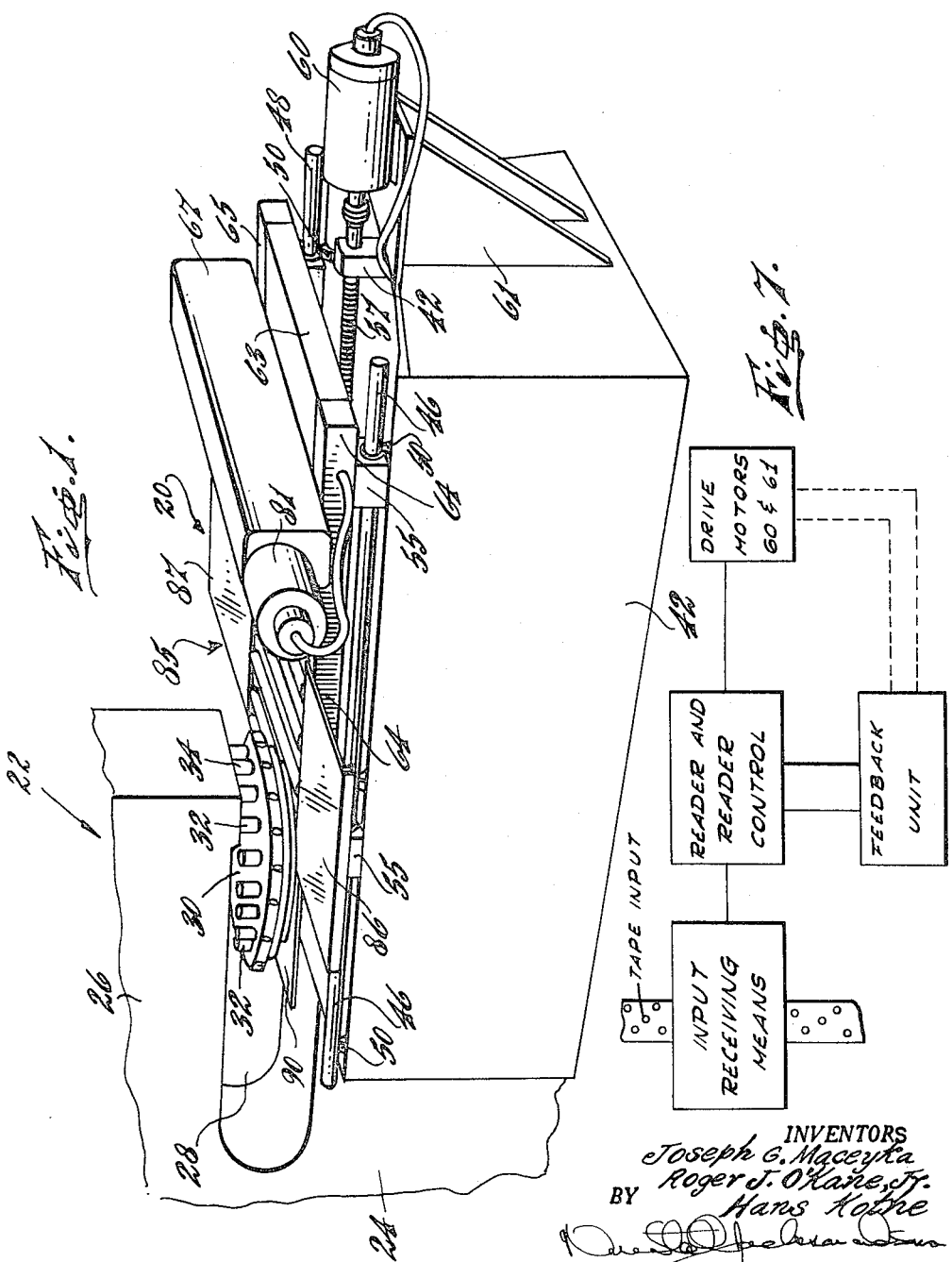
FIGURE 1 is a perspective view of the table assembly of the invention being used with a turret punch press.
Figure 2:
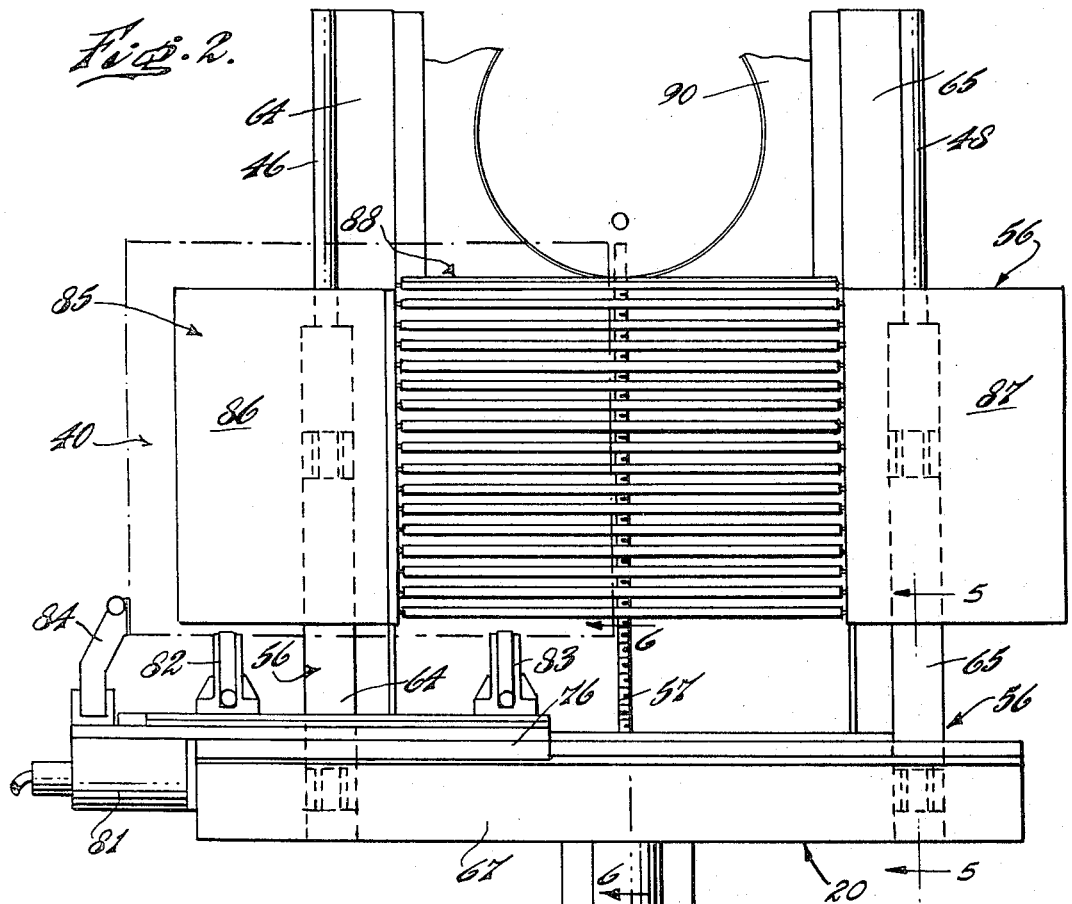
FIGURE 2 is a top plan view of the table assembly of FIGURE 1.
Figure 3:
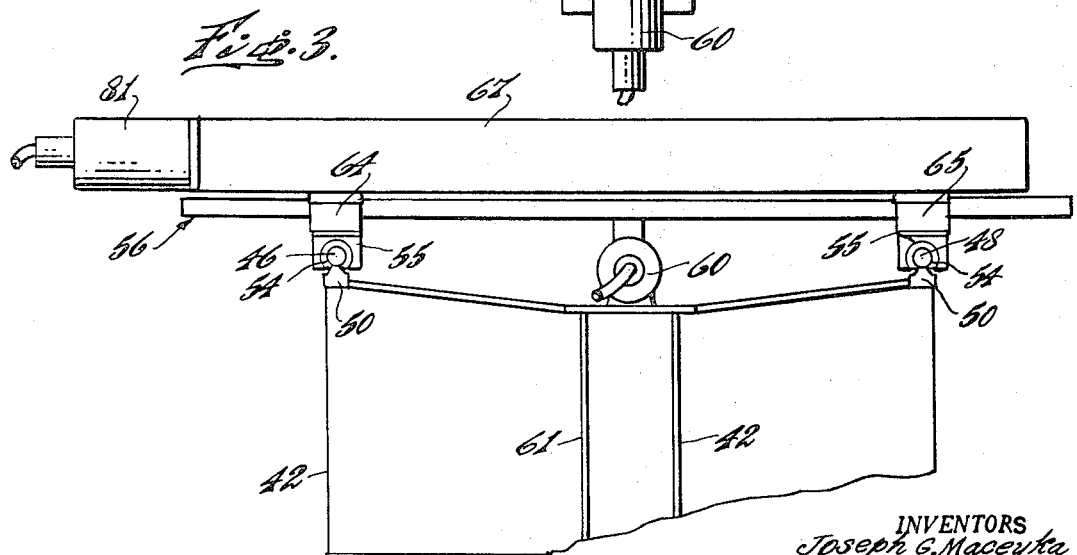
FIGURE 3 is a front elevational view of the table assembly of FIGURES 1 and 2.

Describing in illustration but not in limitation and referring to the drawings:

The table assembly of the invention is of the type wherein a workpiece is moved on a Y axis toward and away from a machine tool on one hand and on an X axis lateral of the machine tool on the other hand. The workpiece is normally a metal sheet lying horizontally flat, so that by virtue of this X and Y axes movement, machine operations can be performed at any coordinate position on the workpiece. For instance, a metal sheet can be manipulated in a punch press so that a plurality of holes may be punched at different locations in the sheet.

Table assemblies of this type in the prior art generally have a base, a carriage slidable in a Y direction on the base longitudinally toward and away from the machine tool. The carriage carries with it a table to support the piece. A cross-slide mounted on the carriage grips the workpiece, and manipulates the workpiece laterally on the carriage, or in a Y direction laterally of the machine tool.

Various means for supporting and positioning the carriage from the base and the cross-slide from the carriage have been disclosed in the prior art, including those shown in United States Patents 2,701,017 and 2,807,219. In the principal prior art embodiment, T cross-section tracks are used to support the carriage and cross-slide in first and second directions perpendicular to one another. Rollers journaled on vertical, horizontal, and inclined bearing axes ride on the tracks. Such an arrangement involves very accurate adjustment of the rollers to achieve proper clearances to prevent binding and to avoid undue movement of the table in a direction other than that longitudinal of the track. Additionally, these tracks have been of relatively large cross-section, in order to provide sufficient surface on which the rollers can engage. The size of these tracks in many instances has interfered with the area in which the machine tool operates, for instance, the turret of a turret punch press. Considering that such tracks have been made necessary in both a longitudinal and lateral direction to oppose thrust, a substantial amount of interference has often occurred in the working area of the machine tool.

A conventional means of positioning or moving the table in the prior art has been through a rack gear and a pinion arrangement. The rack gear may be either on the table support or the base, and the pinion on the other member. The rack pinion has been driven by suitable drive means so that the table support can be moved to the desired position. As with the tracks, the racks have often been of substantial size, and in most instances it is necessary that they occur in pairs both in an X and Y direction. Thus, it has been necessary to have four racks with the accompanying pinions. Thus, in the prior art, the table assemblies have had relatively slow moving members due to the complicated drive arrangement and the inertia of the relatively heavy and bulky guide and positioning members. Likewise, the prior art table assemblies have been of a relatively low degree of accuracy, since clearances and tolerances in the tracks, rollers, racks, and pinions have been substantial.

In the present invention, the difficulties encountered above in the prior art table assemblies have been eliminated, and an arrangement which results in high accuracy, high speed of movement, easy maintenance, compactness, and neatness is provided.

Essentially, the present mechanism comprises a table assembly base, a U-shaped carriage disposed horizontally on the table assembly base, and a cross-slide on the base of the U-shaped carriage. The arms of the U-shaped carriage extend in a Y direction, and the base of the U-shaped carriage extends in an X direction. The Y axis is considered to be longitudinal through the working head of the machine tool, and the X axis is considered lateral of the working head of the machine tool. Parallel, spaced shafts of circular cross-section are respectively mounted on the table assemly base beneath each of the arms of the U-shaped carriage, and linear bushings on the arms of the U-shaped carriage ride on the shafts. A drive screw journaled on the table assembly base on the Y axis is connnected to the carriage through a nut follower on the base of the U-shaped carriage and drives the carriage in the Y direction toward and away from the machine tool, with the work sheet generally resting on the arms of the U-shaped carriage. In the forwardmost position of the carriage, which has the open end of the U directed toward the machine tool, the arms of the U-shaped carriage straddle the work head of the tool so there is no interference between the carriage and the machine tool. Suitable side table surfaces are fixed to the arms of the U-shaped carriage and extend laterally outwardly thereof to provide added support for the workpiece.

A cross-slide is journalled on the base of the U-shaped carriage on circular shafts similar to those supporting the carriage, and a drive screw extending in a Y direction positions the cross-slide. Work locators and holders on the cross-slide locate and grip the workpiece whereby the piece is positioned laterally on the carriage. By selectively rotating either the drive screw connected to the carriage, or the drive screw on the cross-slide, the workpiece can be brought into any selected coordinate position with respect to the working head of the machine tool.

Considering the invention in detail, and referring to the drawings, there is shown a table assembly 20 which is fixed to a machine tool, in this instance a turret punch press 22. The prior art turret punch press 22 as shown has a lower frame portion 24, an upper frame portion 26 and a throat 28. An upper turret 30 journaled in the upper frame 26 has a plurality of punches 32 suitably individual in character, differing among the different punches in diameter, contour or both. A bottom turret (not shown) rotatably mounted on the bottom frame portion 24 supports dies corresponding in size of opening and contour with the corresponding punches. It is thus evident that the operator is offered a selection of sizes and types of punches and cooperating dies, any one of which may be selectively brought into punching engagement by rotation of the turret, at location 34, within the ram of the turret punch press.

The device of the invention is concerned with positioning a workpiece 40, comprising a flat sheet metal piece of any size and shape, shown here as a rectangle, into position at the punching point 34.

The table assembly 20 consists of a table assembly base 42 having supported thereon parallel spaced shafts 46 and 48 of circular cross-section and formed preferably of hardened steel, which are precision ground to a circircular cross-section. The shafts may be of, for instance, a 2-inch diameter. The shafts 46 and 48 are supported from the base 42 on mounts 50. These mounts are in the form of spaced pillars positioned between the shaft and the base, and having some securing means, such as stud bolts, extending through the base, pillar, and shaft. This arrangement of shaft and mounts eliminates shaft deflection and provides rigidity on long shafts.

The mounts 50 are secured to the table assembly base 42. Riding on each of the shafts 46 and 48 are linear ball bushings 54 of an open type having a plurality of circumferentially spaced longitudinally extending ball bearings which ride on the circular shafts 46 and 48. These open type of ball bushings are essentially a cylinder having a longitudinal portion removed from their circumference, to permit the use of the shaft support mounts 50, described above. In bearings of this type, oblong circuits of balls are provided within the bearing, each of which has the balls in one of its straight sides in bearing contact between the inner surface of the bushing sleeve and the shaft.

The linear ball bushings 54 are supported in individual mounting blocks 55 which are secured on the carriage 56.

The carriage 56 is thus free to slide in a Y-axis direction toward and away from the punching location 34 of the turret punch press 22 under the drive of a helically threaded screw 57 rotationally journaled in thrust bearings 58 mounted on the table assembly base 42. The screw 57 is positioned centrally between, and extends parallel to, the shafts 46 and 50.

The screw 57 is free to rotate within the thrust bearings 58 but is restrained from endwise or longitudinal movement with respect to the base. A drive motor 60, supported from the table assembly base 42 on shelf 61 and suitably hydraulic, is connected to screw 57 through coupling 62, and selectively rotates screw 57 in either angular direction.

The carriage 56 is of U-shape and essentially comprises a transverse beam 63 forming the base of the U-shaped carriage 56 and longitudinal beams 64 and 65 secured to the transverse beam at the ends thereof and extending toward the machine tool. The beams 64 and 65 form the arms of the U.

Each of the beams 64 and 65 has affixed thereto mounting blocks 55 mounting linear bushings 54, as described earlier. Thus, the carriage 56 is free to rest on, and ride, the shafts 46 and 48.

A nut follower 66, as best seen in FIGURE 6, is welded or otherwise fixedly secured to the bottom center of transverse beam 66 and is threadedly engaged with screw thread 57. Thus, rotation of screw 57 results in nut follower 66 and carriage 56 being forced in a forward or return direction from the machine tool, or a Y direction.

The longitudinal beams 64 and 65 of the U-shaped carriage 56 have extending across them, at the base of the U in the vicinity of the transverse beam 63, a cross bar 67 shown suitably in the cross-section form of a C-shaped channel and extending laterally beyond the longitudinal beams 64 and 65. The cross bar 67 is secured to the longitudinal beams 64 and 65 as by welding or bolting at 68. The C-shaped cross-section cross bar 67 has secured thereto pillars 70 and 71 for supporting shafts 72 and 73 respectively. The pillars 70 and 71, and shafts 72 and 73, are of the same construction as that of pillar mounts 50 and shafts 46 and 48 described earlier.

Split, open, longitudinal bearings 74 and 75 ride on and are supported by shafts 72 and 73 and are mounted within a cross-slide 76 and affixed thereto. Cross-slide 76 is of a channel construction and has extending therefrom a bracket 77 as best seen in FIGURE 5 having thereon a nut follower 78. Follower 78 is threadedly engaged with helical thread screw 80. Screw 80 is rotationally journaled within cross bar 67 in thrust bearings in the same manner that screw 57 is journaled in the base. A drive motor 81 mounted on the end of cross bar 67 as by bolting is coupled to helical screw 80. The motor can be selectively driven in either angular direction to rotate screw 80, thus driving follower 78 and cross-slide 76 laterally of the carriage 56.

Cross-slide 76 has affixed thereto suitable work holders 82 and 83 and end locator 84 of any conventional type. Work holders 82 and 83 securely grasp a work sheet 40, as shown in phantom in a vise-like grip after the sheet has been located laterally by end locator 84. The functions and operations of work holders and end locators are well known in the art, and for purposes of clarity, a detailed description of these elements will be omitted.

It will be seen that when workpiece 40 is clamped in work holders 82 and 83, lateral or X-axis movement of the cross-slide 76 will result in the piece 40 likewise being shifted laterally on carriage 56. The sheet 40 rests on a table 85 supported from carriage 56. Table 85 includes side surfaces 86 and 87 rigidly secured to longitudinal beams 64 and 65 respectively. Tubular rollers 88 extend between the table side surfaces 86 and 87 and are suitably supported and journaled from the table assembly base 42. The rollers 88 are aligned in a Y direction with the fixed apron 90 on the turret press at the die height.

Suitable means, such as hydraulic pistons and cylinders 91 may be used to activate the work holders 82 and 83 to selectively engage the work sheet.

Considering the operation of the device, Y-axis drive motor 60 is energized to rotate screw thread 57 in an angular direction whereby follower 66 is driven away from the turret punch press 22. Carriage 56, supported on bushings 54, is likewise driven away from the turret press in a Y direction, since follower 66 is secured to the carriage 56. Carriage 56 carries with it table 85 comprised of side surfaces 86 and 87 and cross bar 67, carrying with it cross-slide 76.

At the rearwardmost, or withdrawn, position, drive motor 60 is halted, whereupon flat workpiece 40 is placed on the table 85 in a position by means of end locator 84 and work holders 82 and 83. The work holders 82 and 83 are activated by pneumatic cylinders 91, so that the workpiece is clamped to the cross-slide 76 and supported by table surfaces 86 and 87, and rollers 88. The workpiece is then selectively brought into position in the turret punch press 22 at ram position 34 by controllably energizing carriage drive motor 60 and cross-slide drive motor 81. The carriage 56 moves forward on bushings 54 riding on shafts 46 and 48, whereas cross-slide 76 supported on bushings 74 and 75 riding on shafts 72 and 73 moves and positions the piece 40 in an X direction. As the carriage moves forward into a position wherein the work sheet 40 extends beyond rollers 88, the apron 90 of the turrent punch press 22 supports the workpiece along with table side surfaces 86 and 87. The cross-slide is driven in an X direction to shift workpiece 40 laterally of the punch press.

After the punching or other machining operations are completed, the carriage 56 is withdrawn from the press area 34, the piece 40 shifted to the desired position on the X axis, the work holders 82 and 83 disengaged from the piece, and the piece removed. The cycle can then be repeated.

The drive motors 60 and 81 are controlled desirably automatically by any positioning program control, as well known in the prior art, including, for instance, by tape means. Such positioning control programs involve in combination input receiving means for receiving an input of intelligence in the form of a punched tape or the like, a reader control unit which reads the input and transmits electrical signals to the drive motors positioning the table, and a feedback unit which senses the workpiece position and signals the reader control to that effect. The positioning program control means is shown schematically in FIGURE 7.

In view of our invention and disclosure, variations and modifications to meet individual whim or particular need will doubtless become evident to others skilled in the art, to obtain all or part of the benefits of our invention without copying the structure shown, and we therefore claim all such insofar as they fall within the reasonable spirit and scope of our claims.

Having thus described our invention, what we claim as new and desire to secure by Letters Patent is:

1. In a table assembly for positioning a flat work sheet within a machine tool at a plurality of coordinate positions determined with respect to a Y direction extending longitudinally of the machine tool and an X direction extending laterally of the machine tool: a table assembly base; a first pair of spaced parallel shafts extending in the Y direction and of circular cross-section mounted on the table assembly base; a U-shaped carriage disposed horizontally with the open end of the U toward the machine tool, said carriage including a transverse beam extending in the X direction and a pair of longitudinal beams extending in the Y direction joined to the transverse beam; first linear bushings journaled on the first shafts and fixedly mounted on each of the longitudinal beams of the U-shaped carriage, whereby the carriage can ride on the first shafts in a Y direction forward toward the machine tool and rearward away from the machine tool; a first threaded drive screw extending in a Y direction and rotationally journaled on the table assembly base; means for selectively driving the first drive screw; a first nut follower on the U-shaped carriage at the closed end thereof in threaded engagement with the first screw; a second pair of spaced parallel shafts of circular cross-section fixed to the U-shaped carriage at the closed end thereof and extending in an X direction; a second threaded drive screw extending parallel to the second shafts and rotationally journaled on the carriage; means for selectively driving the second drive screw; second linear bushings journaled on the second shafts and free to slide longitudinally along the second shafts; a cross-slide fixed to and mounted on the second linear bushings; a second nut follower in threaded engagement with the second drive screw and fixedly secured to the cross-slide; and work locator and work holding means on the cross-slide.

2. A table assembly of claim 1, wherein the means for selectively driving the first and second screws comprises drive motors controlled by positioning program control means having input receiving means for receiving intelligence in pre-arranged form, reader means for reading the intelligence received by the input receiving means, reader control means for transmitting electrical signals from the reader means to the drive motors, and feedback means for sensing the workpiece position and signalling the reader control means.

References Cited

UNITED STATES PATENTS

| | | | |
|---|---|---|---|
| 2,838,967 | 6/1958 | Meyer | 77—63 |
| 3,124,018 | 3/1964 | Gough | 77—63 |
| 3,164,909 | 1/1965 | Rosenberg | 77—63 X |
| 3,230,810 | 1/1966 | Kihlstrom et al. | 83—410 |
| 3,302,494 | 2/1967 | Taysom et al. | 83—412 X |
| 3,350,088 | 10/1967 | Schott | 83—412 X |

ANDREW R. JUHASZ, Primary Examiner.

FRANK T. YOST, Assistant Examiner.

U.S. Cl. X.R.

269—60